(12) United States Patent
Li

(10) Patent No.: US 12,475,571 B2
(45) Date of Patent: Nov. 18, 2025

(54) METHOD, APPARATUS, AND DEVICE FOR TRACKING SELECTED TARGET ACCORDING TO STATE INFORMATION OF THE SELECTED TARGET, SINGLE-TARGET TRACKED RESULT, AND MULTIPLE-TARGET TRACKED RESULTS

(71) Applicant: AUTEL ROBOTICS CO., LTD., Shenzhen (CN)

(72) Inventor: Yaxue Li, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 371 days.

(21) Appl. No.: 18/203,644

(22) Filed: May 30, 2023

(65) Prior Publication Data
US 2023/0306615 A1  Sep. 28, 2023

Related U.S. Application Data

(63) Continuation of application No. PCT/CN2021/128768, filed on Nov. 4, 2021.

(51) Int. Cl.
*G06T 7/20* (2017.01)
*G06T 7/70* (2017.01)
(Continued)

(52) U.S. Cl.
CPC ............... *G06T 7/20* (2013.01); *G06T 7/70* (2017.01); *G06V 10/761* (2022.01); *G06V 20/52* (2022.01);
(Continued)

(58) Field of Classification Search
CPC .......... G06T 7/20; G06T 7/246; G06T 7/248; G06T 7/251; G06T 7/277; G06T 7/70;
(Continued)

(56) References Cited

U.S. PATENT DOCUMENTS

| | | | |
|---|---|---|---|
| 11,062,462 B2 * | 7/2021 | Porat | G06T 7/246 |
| 2023/0036905 A1 * | 2/2023 | Xu | G06V 10/56 |
| 2023/0177705 A1 * | 6/2023 | Kitazawa | G06T 7/251 |
| | | | 382/103 |

FOREIGN PATENT DOCUMENTS

| | | |
|---|---|---|
| CN | 104732187 A | 6/2015 |
| CN | 105118072 A | 12/2015 |

(Continued)

OTHER PUBLICATIONS

Pu, Kejia, Zhichao Lian, and Zhongeng Liu. "Multiple objects tracking based on multiple information integration." 2017 International Conference on Progress in Informatics and Computing (PIC). IEEE (Year: 2017).*

(Continued)

*Primary Examiner* — Scott A Rogers
(74) *Attorney, Agent, or Firm* — Arch & Lake LLP; Hao Tan; Shen Wang

(57) ABSTRACT

A target tracking method, apparatus, device, and storage medium are disclosed. A single-target tracked result for a selected target and a multiple-target tracked result for multiple targets are acquired. The multiple targets include the selected target which is a target determined according to position information from an external device. The state information about the selected target is determined according to the single-target tracked result and the multiple-target tracked result. The selected target is tracked according to the state information about the selected target, the single-target tracked result and the multiple-target tracked result, so that the robustness of single-target tracking can be improved is achieved.

20 Claims, 2 Drawing Sheets

(51) Int. Cl.
*G06V 10/74* (2022.01)
*G06V 20/52* (2022.01)
(52) U.S. Cl.
CPC .................. *G06T 2207/30232* (2013.01); *G06V 2201/07* (2022.01)
(58) Field of Classification Search
CPC .... G06T 7/73; G06T 7/74; G06T 7/75; G06T 7/77; G06T 2207/30196; G06T 2207/30232; G06T 2207/30236; G06V 10/62; G06V 10/761; G06V 20/52; G06V 20/54; G06V 20/58; G06V 20/588; G06V 2201/07; H04N 23/60; H04N 23/61; H04N 23/69; H04N 23/695; H04N 7/18–188
See application file for complete search history.

(56) References Cited

FOREIGN PATENT DOCUMENTS

| CN | 108269269 A | * | 7/2018 | ............ G06T 7/246 |
|---|---|---|---|---|
| CN | 110766715 A | | 2/2020 | |
| CN | 111242977 A | | 6/2020 | |
| CN | 112634355 A | | 4/2021 | |
| WO | 2018121286 A1 | | 7/2018 | |

OTHER PUBLICATIONS

International Search Report issued in Application No. PCT/CN2021/128768, dated on Jan. 30, 2022, (4p).

* cited by examiner

METHOD, APPARATUS, AND DEVICE FOR TRACKING SELECTED TARGET ACCORDING TO STATE INFORMATION OF THE SELECTED TARGET, SINGLE-TARGET TRACKED RESULT, AND MULTIPLE-TARGET TRACKED RESULTS

CROSS-REFERENCE TO RELATED APPLICATIONS

This application is a continuation application of International Application No. PCT/CN2021/128768, filed on Nov. 4, 2021, which claims the benefit of priority of Chinese Patent Application No. 2020115321462, filed on Dec. 22, 2020, the entire content of which is incorporated herein by reference.

TECHNICAL FIELD

Embodiments of the present disclosure relate to target tracking technology, in particular to a target tracking method, apparatus, device and storage medium.

BACKGROUND

Target tracking has a wide range of applications in the field of toll machine; an object of the present disclosure is to provide the position of a tracked target in an image of a pan-tilt camera. Current vision-based single tracking algorithms, whether depth learning-based tracking algorithms or traditional machine learning-based algorithms, have poor robustness to similar interference targets of the same category (e.g., cars of the same color, people wearing clothes of the same color, etc.), especially when similar targets are obstructed, the interference targets would easily be tracked.

SUMMARY

The present disclosure provides a target tracking method, apparatus, device, and storage medium that can improve the robustness of single-target tracking.

In a first aspect, embodiments of the present disclosure provide a target tracking method including: acquiring a single-target tracked result for a selected target and a multiple-target tracked result for multiple targets, wherein the multiple targets comprise the selected target which is a target determined according to position information from an external device; determining state information about the selected target according to the single-target tracked result and the multiple-target tracked result; and tracking the selected target according to the state information about the selected target, the single-target tracked result and the multiple-target tracked result.

In a second aspect, embodiments of the present disclosure also provide a target tracking apparatus including one or more processors configured to: acquire a single-target tracked result for a selected target and a multiple-target tracked result for multiple targets, wherein the multiple targets comprise the selected target which is a target determined according to position information input from an external device; determine state information about the selected target according to the single-target tracked result and the multiple-target tracked result; and track the selected target according to the state information about the selected target, the single-target tracked result and the multiple-target tracked result.

In a third aspect, embodiments of the present disclosure also provide a computer device comprising a memory, a processor and a computer program stored on the memory and executable on the processor, which when executed performs the target tracking method according to any of the embodiments of the present disclosure.

In a fourth aspect, embodiments of the present disclosure also provide a computer-readable storage medium having stored thereon a computer program which, when executed by a processor, performs the target tracking method according to any of the embodiments of the present disclosure.

According to embodiments of the present disclosure, a single-target tracked result for a selected target and multiple-target tracked result for multiple targets are acquired, wherein the multiple targets include the selected target which is a target determined according to position information input from the external device by a user. The state information about the selected target is determined according to the single-target tracked result and the multiple-target tracked result. The selected target is tracked according to the state information about the selected target, the single-target tracked result and the multiple-target tracked result, so that the robustness of single-target tracking can be improved is achieved by a technical solution of the present disclosure.

BRIEF DESCRIPTION OF THE DRAWINGS

In order to illustrate the technical solution of the embodiments of the present disclosure more clearly, a brief description will be given below of the accompanying drawings which are required to be used in the embodiments. The following drawings illustrate only some embodiments of the present disclosure and are therefore not to be considered as limiting the scope, and that other related drawings may be obtained by a person skilled in the art without involving any inventive effort.

DETAILED DESCRIPTION

Figure 1:
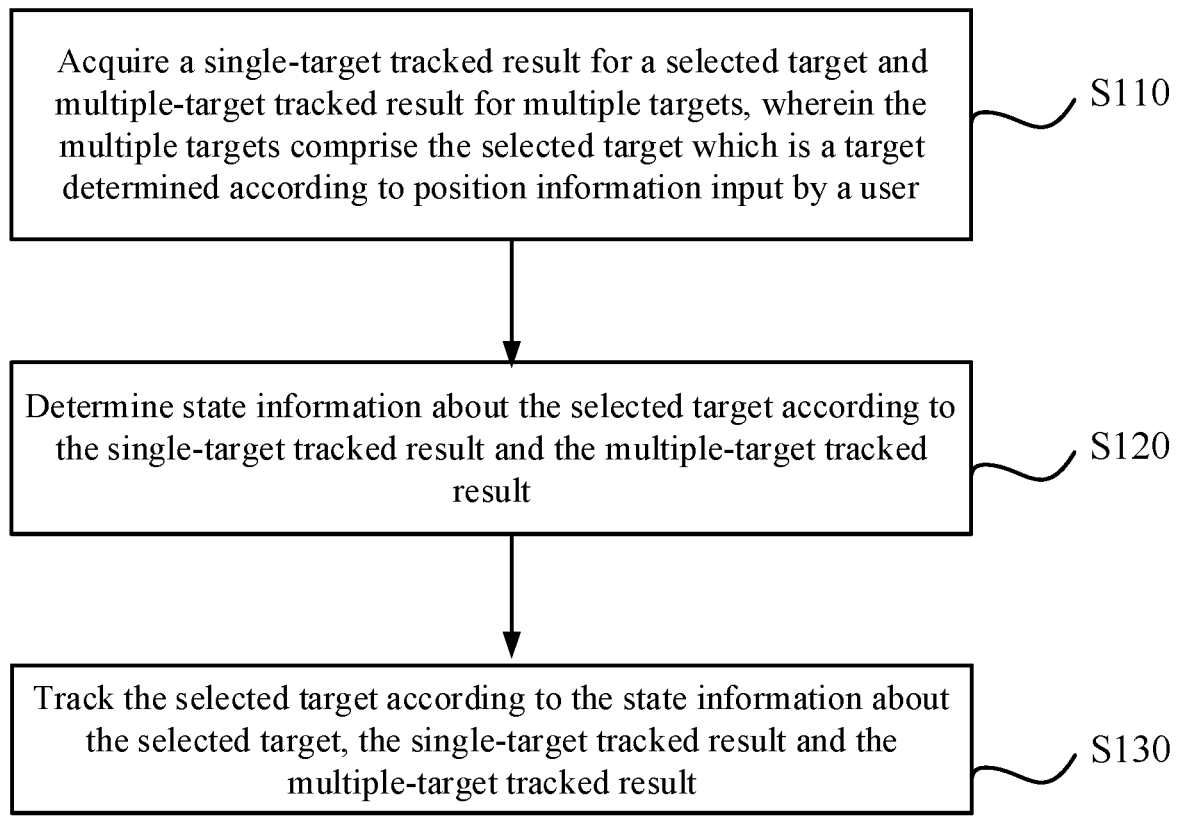
FIG. 1 is a flowchart of a target tracking method in accordance with some implementations of the present disclosure.

The present disclosure will now be described in further detail with reference to the accompanying drawings and examples. The embodiments described herein are illustrative only and are not restrictive. For ease of description, only some, but not all, of the structures associated with the present disclosure are shown in the drawings.

Like numbers and letters refer to like items in the following figures, and thus, once an item is defined in one figure, it need not be further defined and explained in the following figures. Also, in the description of the present disclosure, the terms "first", "second", and the like are used for descriptive purposes only and are not to be construed as indicating or implying relative importance. In some embodiments of the present disclosure, the target may be an aircraft, a car, a person or an animal to be tracked in an image captured by a camera.

FIG. 1 is a flow chart of a target tracking method provided by an embodiment of the present disclosure, and this embodiment is applicable to the case of target tracking, and the method can be executed by a target tracking apparatus according to an embodiment of the present disclosure, and the target tracking apparatus can be implemented in software and/or hardware, and as shown in FIG. 1, the method specifically comprises the following steps:

S110: acquiring a single-target tracked result for a selected target and multiple-target tracked result for multiple targets, wherein the multiple targets comprise the selected target which is a target determined according to position information input from one or more external devices 14 (shown in FIG. 3) by a user;

S120: determining state information about the selected target according to the single-target tracked result and the multiple-target tracked result;

S130: tracking the selected target according to the state information about the selected target, the single-target tracked result and the multiple-target tracked result.

Alternatively, the determining state information about the selected target according to the single-target tracked result and the multiple-target tracked result comprises:

determining position information about the selected target according to the single-target tracked result; and determining position information about multiple targets according to the multiple-target tracked result;

determining that the selected target is in an obstructed state if the similarity between the position information about at least one target in the position information about the multiple targets and the position information about the selected target is greater than or equal to a similarity threshold value; and determining that the selected target is in an unobstructed state if the similarity between the position information about the multiple targets and the position information about the selected target is less than the similarity threshold value.

Alternatively, the determining state information about the selected target according to the single-target tracked result and the multiple-target tracked result comprises:

acquiring a confidence of the single-target tracked result;

determining that the selected target is in a lost state if the confidence of the single-target tracked result is less than a confidence threshold value; and determining that the selected target is in a lost state if the confidence of the single-target tracked result is greater than or equal to the confidence threshold, and a target is not queried in the multiple-target tracked result according to the position information about the selected target.

Alternatively, the multiple-target tracked result comprises: multiple-target position information, multiple-target category information and multiple-target identity information.

Alternatively, the tracking the selected target according to the state information about the selected target and the multiple-target tracked result comprises:

acquiring an intersect over union of the single-target tracked result and the multiple-target tracked result and the category information about the selected target if the selected target is in an unobstructed state;

determining a target set with intersect over union with the selected target in the multiple-target according to the intersect over union of the single-target tracked result and the multiple-target tracked result; and tracking targets in the set of targets that are the same as the category information of the selected target.

Alternatively, the tracking the selected target according to the state information about the selected target and the multiple-target tracked result comprises:

acquiring an intersect over union of the single-target tracked result and the multiple-target tracked result and the category information about the selected target if the selected target is in an obstructed state;

determining a target set with intersect over union with the selected target in the multiple-target according to the intersect over union of the single-target tracked result and the multiple-target tracked result; and tracking a target in the target set that is the same as both category information and identity information about the selected target.

Alternatively, the tracking the selected target according to the state information about the selected target and the multiple-target tracked result comprises:

establishing a first set according to the multiple-target tracked result;

acquiring a target which is different from the identity information about the selected target and has the same category information, and storing same in a second set; and determining a selected target from a third set and tracking the selected target if the selected target is in a lost state, wherein the third set is equal to the difference between the first set and the second set.

The single-target tracked result for the selected target can be position information about the selected target, category information about the selected target and identity information about the selected target.

Alternatively, before acquiring a single-target tracked result for a selected target and multiple-target tracked result for multiple targets, further comprising:

acquiring position information input by a user;

determining the target to which the position information belongs as a selected target if the position information is inside a target; and determining a target of the at least two targets having the smallest distance to the position information as a selected target if the position information is inside at least two targets.

The method for acquiring the selected target may be that a user inputs a position information, and the selected target is determined according to the position information input by the user, for example, according to the selection information of the user, a target is selected from the current set C as a tracked target, and it is determined whether a central point of the user selection position falls within the target, and if the central point falls within a plurality of targets, the target with the target center closest to the selected central point is selected. It is represented as:

wherein $B_{user} = \{startx_u, starty_u, w_u, h_u\}$ represents position information input by a user, respectively representing a starting coordinate in an image, and width and height information;

the coordinates of the center point of user selection information are calculated:

$$centerx_u = startx_u + w_u/2;$$

$$centery_u = starty_u + h_u/2;$$

Wherein $startx_u$ is the abscissa of the starting point of the position information input by the user in the image, $starty_u$ is the ordinate of the starting point of the position information input by the user in the image, $w_u$ is the width of the position information input by the user, and $h_u$ is the height of the position information input by the user, for example, the position information input by the user is a rectangle, the coordinate of the starting point of the rectangle is ($startx_u$, $starty_u$), the width of the rectangle is $w_u$, and the height of the rectangle is $h_u$.

The expression for determining whether the center point falls within the target i is:

$$startx_i < centerx_u < (startx_i + w_i) \text{ and } starty_i < centery_u < (starty_i + h_i);$$

if the center point of the rectangle input by the user falls on multiple targets, it is represented by a set Cans, and the selected target is represented by the target closest to the user center point in the set Cans, and the expression is:

$$B_{select} = \min(\text{dist}(center_u, Cans_i));$$

wherein the Cans is a set of targets containing a central point of a rectangle input by a user, $center_u$ and is a coordinate of the central point of the rectangle input by the user.

wherein dist denotes the Euclidean distance dist=$\sqrt{x^2+y^2}$ between coordinate points, x is one coordinate point and y is the other coordinate point. According to an embodiment of the disclosure, x is $center_u$, and y is any target in a Cans set.

The state information of the selected target is determined according to the multiple-target tracked result and the single-target tracked result, and the embodiment of the present disclosure does not limit thereto.

The similarity between the position information about at least one target in the position information about the multiple targets and the position information about the selected target is greater than or equal to a similarity threshold value means that the targets in the multiple targets overlap the selected target more. The similarity threshold may be set according to needs or may be set by a user, and embodiments of the present disclosure are not limited thereto.

By way of example, if a target in multiple targets overlaps with a selected target more, it is determined that the selected target is obstructed by a homogeneous target, and then the selected target needs to be determined according to the ID of the selected target, and the selected target is tracked.

The confidence threshold may be set as desired or may be set by the user, and embodiments of the present disclosure do not limit thereto.

The state information about the selected target comprises: selected target lost state, selected target obstructed state, selected target unobstructed state, etc., and embodiments of the present disclosure do not limit thereto.

The identity information of the multiple-target comprises the ID of the multiple-target, and may also comprise other identity information, and the embodiments of the present disclosure are not limited thereto.

The single-target tracked result comprises: position information about the selected target, category information about the selected target and identity information about the selected target.

The first set may be multiple-target tracked result, for example, the first combination may be a set C={{$b_1$, $c_1$, $ID_1$}, {$b_2$, $c_2$, $ID_2$}, ... {$b_n$, $c_n$, $ID_n$}}. Wherein {$b_1$, $c_1$, $ID_1$} represents a target, {$b_1$, $b_2$, ..., $b_n$} is position information of the target in an image, {$c_1$, $c_2$, ..., $c_n$} is category ID information, and {$ID_1$, $ID_2$, ..., $ID_n$} is an ID assigned to the current target. Due to the interference of multiple-target tracking technology and natural environment, the ID hopping of the same target occurs in multiple-target tracking process.

The second set is used for storing targets with different identity information and the same category information as the selected targets. The third set is equal to the difference between the first set and the second set, for example, if the first set comprises: target A, target B and target C, the second set comprises: target B, then the third set comprises: target A and target C.

In a specific example, multiple-target tracking techniques: in a continuous video sequence, targets in the current frame can be detected and associated with previous and subsequent frames, the targets in the scene remain the same ID for a long time, new targets introduce new IDs, and disappeared targets cancel the current ID.

However, for single-target tracking, only one target is contained, and the tracked target is selected by a user, and position information about the target is obtained in a subsequent video sequence.

Detailed Solution:

firstly, multiple-target tracking technology is run to detect targets in a scene, and each target is tracked, and the running result of multiple-target tracking is represented by a set C={{$b_1$, $c_1$, $ID_1$}, {$b_2$, $c_2$, $ID_2$}, ... {$b_n$, $c_n$, $ID_n$}}, wherein {$b_1$, $c_1$, $ID_1$} represents a target, {$b_1$, $b_2$, ..., $b_n$} is position information of the target in an image, {$c_1$, $c_2$, ..., $c_n$} is category ID information, and {$ID_1$, $ID_2$, ..., $ID_n$} is an ID assigned to the current target. Due to the interference of multiple-target tracking technology and natural environment, the ID hopping of the same target occurs in multiple-target tracking process;

a user inputs a position information, and the selected target is determined according to the position information input by the user, for example, according to the selection information of the user, a target is selected from the current set C as a tracked target, and it is determined whether a central point of the user selection position falls within the target, and if the central point falls within a plurality of targets, the target with the target center closest to the selected central point is selected When the selected target is determined $B_{select}$, the relevant category information $c_{select}$ and $ID_{select}$ information thereof can be obtained; at this moment, a distractor set is established, and IDs of other categories in the current detection set which are the same as the selected target category $c_{select}$ are put into the distractor set.

In the tracking process, the IOU and category of tracked results $b_{tk}$ and detected results $b_{det}$ are used to select targets, which can be divided into the following cases for processing:

1) in the case where no homogeneous target obstruction occurs, ID is not used as a determination condition, an intersect over union (IOU) and category information are used as a determination condition, and the reason why ID is not used as a determination condition is to prevent tracking failure caused by ID hopping:

$$b_{tk}^i = \operatorname*{argmax}\left(\frac{b_{tk}^{i-1} \cap b_{det}^i}{b_{tk}^{i-1} \cup b_{det}^i}\right)$$

and $$c_{select} = c_{det};$$

wherein $$\text{argmax}\left(\frac{b_{tk}^{i-1} \cap b_{det}^{i}}{b_{tk}^{i-1} \cup b_{det}^{i}}\right)$$

is the target with the maximum intersect over union with the selected node.

2) When the similar target obstruction occurs, ID is used as the determination condition to prevent selecting a wrong target due to similarity of targets of the same category:

$$b_{tk}^{i} = \text{argmax}\left(\frac{b_{tk}^{i-1} \cap b_{det}^{i}}{b_{tk}^{i-1} \cup b_{det}^{i}}\right)$$

and $$c_{select} = c_{det}$$

and $$ID_{select} = ID_{det};$$

3) when the target is lost, the retest target also excludes the target in the distractor set, prevents the retest error due to the similarity of targets of the same category, and only retest the same ID and the new ID. The formula is as follows:

redection∈(C−distractor);

when the execution of each of the above cases ends, the distractor set shall be synchronized according to the current multiple-target tracked result; determining whether homogeneous target obstruction occurs can be determined by whether a homogeneous target IOU is greater than a set threshold value in the current tracked target and the detected result.

In the embodiment of the present disclosure, in the case where no homogeneous target obstruction occurs, an ID is not used as a determination condition to reduce the impact of ID hopping in multiple-target tracking; in the case of obstruction, according to the multiple-target tracking technology, the same type of targets that are obstructed always keep the same ID as the distractor to prevent tracking to the wrong target due to the similarity of targets at this time; when the selected target is lost, other similar distractor in the scene can be known in advance, and re-detection can be performed from the new ID to exclude the interference of distractor. After introducing multiple-target tracking technology, the impact of ID hopping in multiple-target technology on tracking is eliminated, and the robustness of single-target tracking is further improved.

According to the technical solution of the embodiment, a single-target tracked result for a selected target and multiple-target tracked result for multiple targets are acquired, wherein the multiple targets comprise the selected target which is a target determined according to position information input by a user; state information about the selected target is determined according to the single-target tracked result and the multiple-target tracked result; the selected target is tracked according to the state information about the selected target, the single-target tracked result and the multiple-target tracked result, so that the robustness of single-target tracking can be improved achieved by a technical solution of the present disclosure.

Figure 2:
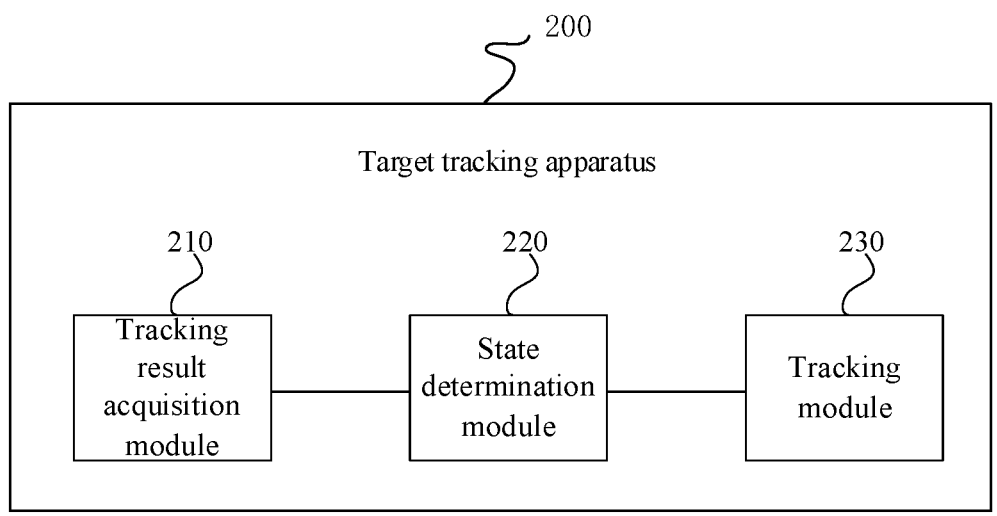
FIG. 2 is a schematic structural diagram showing a configuration of a target tracking apparatus in accordance with some implementations of the present disclosure.

FIG. 2 is a schematic view showing a structure of a target tracking apparatus 200 according to a second embodiment of the present disclosure. The embodiment can be applied to the case of target tracking, and the target tracking apparatus 200 can be implemented in software and/or hardware; the target tracking apparatus 200 can be integrated in any device providing a target tracking function, and as shown in FIG. 2, the target tracking apparatus 200 comprises: a tracked result acquisition module 210, a state determination module 220, and a tracking module 230.

A tracked result acquisition module 210 is configured to acquire a single-target tracked result for a selected target and multiple-target tracked result for multiple targets, wherein the multiple targets comprise at least two targets, and the selected target is a target determined according to position information input from the external device 14 by a user;

a state determination module 220 configured to determine state information about the selected target according to the single-target tracked result and the multiple-target tracked result; and a tracking module 230 configured to track the selected target according to the state information about the selected target, the single-target tracked result and the multiple-target tracked result.

Alternatively, the determination module is configured to:
determine position information about the selected target according to the single-target tracked result; and
determine position information about multiple targets according to the multiple-target tracked result;
determine that the selected target is in an obstructed state if the similarity between the position information about at least one target in the position information about the multiple targets and the position information about the selected target is greater than or equal to a similarity threshold value; and
determine that the selected target is in an unobstructed state if the similarity between the position information about the multiple targets and the position information about the selected target is less than the similarity threshold value.

Alternatively, the determination module is configured to:
acquire a confidence of the single-target tracked result;
determine that the selected target is in a lost state if the confidence of the single-target tracked result is less than a confidence threshold value; and
determine that the selected target is in a lost state if the confidence of the single-target tracked result is greater than or equal to the confidence threshold, and a target is not queried in the multiple-target tracked result according to the position information about the selected target.

Alternatively, the multiple-target tracked result comprises: multiple-target position information, multiple-target category information and multiple-target identity information.

Alternatively, the tracking module is configured to:
acquire an intersect over union of the single-target tracked result and the multiple-target tracked result and the category information about the selected target if the selected target is in an unobstructed state;
determine a target set with intersect over union with the selected target in the multiple-target according to the intersect over union of the single-target tracked result and the multiple-target tracked result; and
track a target in the set of targets that is the same as the category information of the selected target.

Alternatively, the tracking module is configured to:
acquire an intersect over union of the single-target tracked result and the multiple-target tracked result and the category information about the selected target if the selected target is in an obstructed state;
determine a target set with intersect over union with the selected target in the multiple-target according to the intersect over union of the single-target tracked result and the multiple-target tracked result; and
track a target in the target set that is the same as both category information and identity information about the selected target.

Alternatively, the tracking module is configured to:
establish a first set according to the multiple-target tracked result;
acquire a target which is different from the identity information about the selected target and has the same category information, and storing same in a second set; and
determine a selected target from a third set and tracking the selected target if the selected target is in a lost state, wherein the third set is equal to the difference between the first set and the second set.

Alternatively, further comprising:
a position information acquisition module configured to acquire position information input by a user before acquiring a single-target tracked result for a selected target and multiple-target tracked result for multiple targets;
a first target determination module configured to determine the target to which the position information belongs as a selected target if the position information is inside a target; and
a second target determination module configured to determine a target of the at least two targets having the smallest distance to the position information as a selected target if the position information is inside at least two targets.

The above-mentioned product can execute the method provided by any embodiment of the present disclosure, and has corresponding functional modules and advantages for executing the method.

According to the technical solution of the embodiment, a single-target tracked result for a selected target and multiple-target tracked result for multiple targets are acquired, wherein the multiple targets comprise the selected target which is a target determined according to position information input by a user; state information about the selected target is determined according to the single-target tracked result and the multiple-target tracked result; the selected target is tracked according to the state information about the selected target, the single-target tracked result and the multiple-target tracked result, so that the robustness of single-target tracking can be improved is achieved by a technical solution of the present disclosure.

Figure 3:
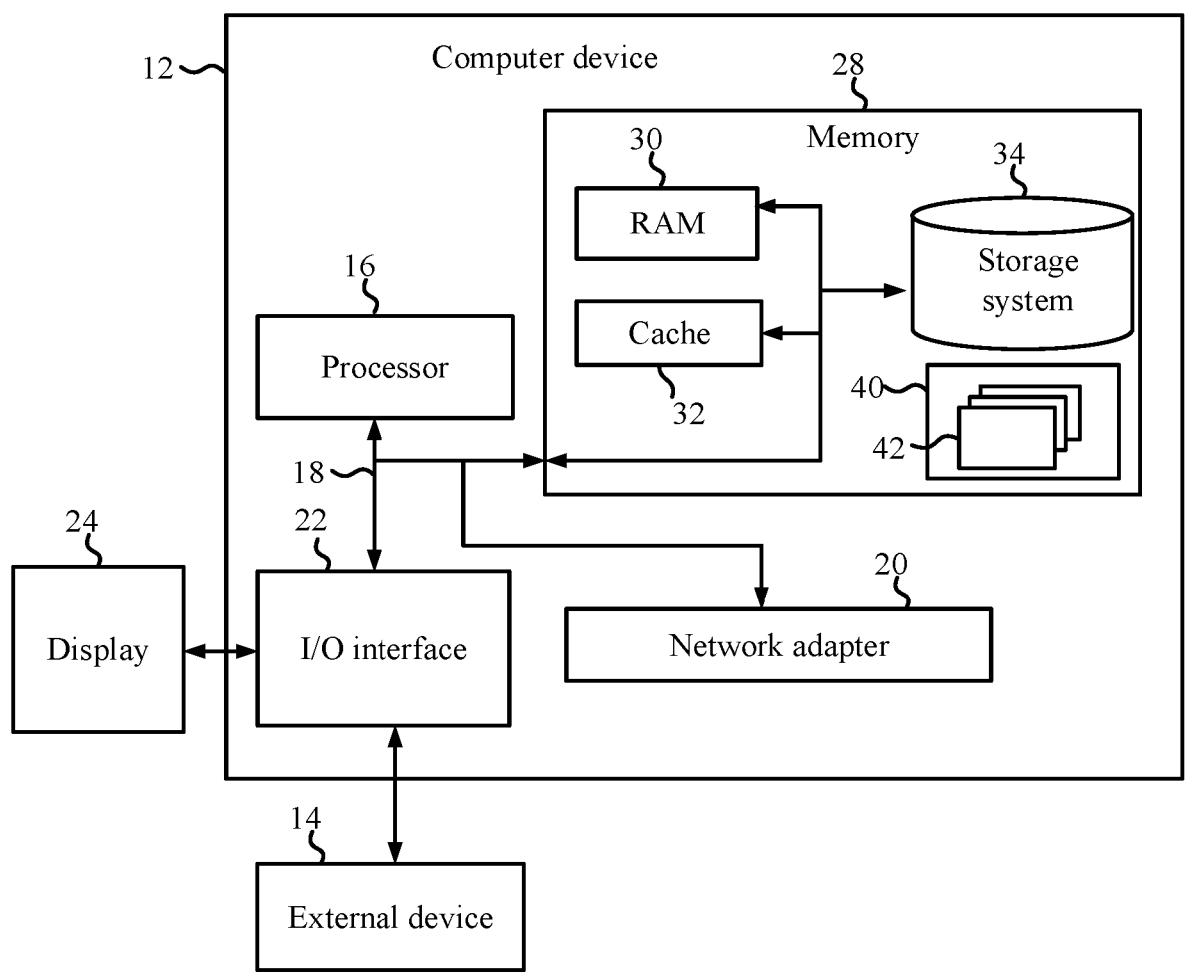
FIG. 3 is a schematic structural diagram showing a computer apparatus in accordance with some implementations of the present disclosure.

FIG. 3 is a schematic structural diagram showing a computer apparatus according to a third embodiment of the present disclosure. FIG. 3 illustrates a block diagram of an exemplary computer device 12 suitable for implementing embodiments of the present disclosure. The computer device 12 shown in FIG. 3 is merely an example and should not pose any limitation on the scope of use or functionality of embodiments of the present disclosure.

As shown in FIG. 3, the computer device 12 is in the form of a general-purpose computing device. Components of the computer device 12 may include, but are not limited to: one or more processors or processing units 16, a system memory 28, a bus 18 connecting the various system components, including the system memory 28 and the processing units 16.

Bus 18 represents one or more of several types of bus structures, including a memory bus or memory controller, a peripheral bus, an accelerated graphics port, a processor, or a local bus using any of a variety of bus architectures. By way of example, such architectures include, but are not limited to, an Industry Standard Architecture (ISA) bus, a Micro Channel Architecture (MCA) bus, an enhanced ISA bus, a Video Electronics Standards Association (VESA) local bus, and a Peripheral Component Interconnect (PCI) bus.

The computer device 12 typically includes a variety of computer system readable media. These media may be any available media that can be accessed by the computer device 12 and includes both volatile and nonvolatile media, removable and non-removable media.

The system memory 28 may include computer system readable media in the form of volatile memory such as Random Access Memory (RAM) 30 and/or cache memory 32. The computer device 12 may further include other removable/non-removable, volatile/nonvolatile computer system storage media. By way of example only, the storage system 34 may be used to read from and write to non-removable, non-volatile magnetic media (not shown in FIG. 3, commonly referred to as a "hard drive"). Although not shown in FIG. 3, a magnetic disk drive may be provided for reading from and writing to a removable non-volatile magnetic disk (e.g., a "floppy disk"), as well as an optical disk drive for reading from and writing to a removable non-volatile optical disk (Compact Disc-Read Only Memory, CD-ROM, Digital Video Disc-Read Only Memory, DVD-ROM, or other optical media). In these cases, each drive may be connected to bus 18 through one or more data media interfaces. The memory 28 may include at least one program product having a set (e.g., at least one) of program modules configured to perform the functions of embodiments of the present disclosure.

A program/utility 40, having a set (at least one) of program modules 42, including but not limited to an operating system, one or more application programs, other program modules, and program data, may be stored in, for example, memory 28, each of these examples, or some combination thereof, possibly including an implementation of a network environment. The program module 42 generally performs functions and/or methods in the described embodiments of the disclosure.

The computer device 12 may also communicate with one or more external devices 14 (e.g., a keyboard, pointing device, display 24, etc.), one or more devices that enable a user to interact with computer device 12, and/or any device (e.g., network card, modem, etc.) that enables computer device 12 to communicate with one or more other computing devices. Such communication may occur via an input/output (I/O) interface 22. The position information of the selected targets can be input from the one or more external devices 14 to the computer device 12. In addition, the computer device 12 and the display 24 in the embodiment do not exist as an individual, but are embedded in a mirror surface, which is not displayed on the display surface of the display 24, and the display surface of the display 24 is visually integrated with the mirror surface. Moreover, the computer device 12 may also communicate with one or more networks (e.g., Local Area Network, LAN, wide Area Network, WAN) and/or public networks, such as the Internet, via a network adapter 20. As shown, the network adapter 20 communicates with other modules of the computer device 12 over bus 18. Although not shown, other hardware and/or software modules may be used in conjunction with computer device 12, including but not limited to: microcode, device drivers, redundant processing units, external disk drive arrays, Redundant Arrays of Independent Disks (RAID) systems, tape drives, and data backup storage systems, etc.

The processing unit 16 may include one or more processors configured to execute various functional applications and data processing by executing program instructions stored in the system memory 28, for example, to implement the target tracking method provided by an embodiment of the present disclosure:

acquiring a single-target tracked result for a selected target and multiple-target tracked result for multiple targets, wherein the multiple targets comprise the selected target which is a target determined according to position information input from an external device by a user;

determining state information about the selected target according to the single-target tracked result and the multiple-target tracked result; and tracking the selected target according to the state information about the selected target, the single-target tracked result and the multiple-target tracked result.

The fourth embodiment of the present disclosure provides a computer-readable storage medium having stored thereon a computer program which, when executed by a processor, implements a target tracking method as provided by all the embodiments of the present disclosure of the present application:

acquiring a single-target tracked result for a selected target and multiple-target tracked result for multiple targets, wherein the multiple targets comprise the selected target which is a target determined according to position information input from an external device by a user;

determining state information about the selected target according to the single-target tracked result and the multiple-target tracked result; and tracking the selected target according to the state information about the selected target, the single-target tracked result and the multiple-target tracked result.

Any combination of one or more computer-readable media may be used. The computer readable medium may be a computer readable signal medium or a computer readable storage medium or any combination of the two. The computer-readable storage medium can be, for example but not limited to, an electronic, magnetic, optical, electromagnetic, infrared, or semiconductor system, apparatus, or device, or a combination of any of the foregoing. More specific examples (a non-exhaustive list) of the computer-readable storage medium include: an electrical connection having one or more wires, a portable computer diskette, a hard disk, a Random-access Memory (RAM), a read-only memory (ROM), an Erasable Programmable Read-only Memory (EPROM or flash memory), an optical fiber, a portable Compact Disk Read-only Memory (CD-ROM), an optical storage device, a magnetic storage device, or any suitable combination thereof. In this document, a computer-readable storage medium may be any tangible medium that can contain or store a program for use by or in connection with an instruction execution system, apparatus, or device.

The computer readable signal medium may comprise a data signal embodied in baseband or propagated as part of a carrier wave carrying computer readable program code. Such propagated data signals may take many forms, including but not limited to electromagnetic signals, optical signals, or any suitable combination of the preceding. The computer-readable signal medium may also be any computer-readable medium other than a computer-readable storage medium that can send, propagate, or transport the program for use by or in connection with the instruction execution system, apparatus, or device.

The program code embodied on a computer readable medium may be transmitted over any suitable medium including, but not limited to, wireless, wire, fiber optic cable, RF, and the like, or any suitable combination of the preceding.

In some embodiments, clients, servers may communicate using any currently known or future developed network protocol, such as HyperText Transfer Protocol (HTTP), and may be interconnected with any form or medium of digital data communication (e.g., a communication network). Examples of communication networks include local area networks ("LAN"), wide area networks ("WAN"), internetworks (e.g., the Internet), and peer-to-peer networks (e.g., the ad hoc peer-to-peer network), as well as any network currently known or developed in the future.

The computer-readable medium may be included in the electronic device; it may also be present separately and not fitted into the electronic device.

The computer-readable medium carries one or more programs that, when executed by the electronic device, cause the electronic device to: receive a source text input by a user, and translate the source text into a target text corresponding to a target language; acquire a historical corrective action of the user; correct the target text according to the historical correction behavior, obtain a translation result, and push the translation result to a client where the user is located.

Computer program code for carrying out operations of the present disclosure may be written in one or more programming languages, including target-oriented programming languages, such as Java, smalltalk, C++, and conventional procedural programming languages, such as the "C" language or similar programming languages, or a combination thereof. The program code may execute entirely on the user's computer, partly on the user's computer, as a stand-alone software package, partly on the user's computer, partly on a remote computer, or entirely on the remote computer or server. In the case of a remote computer, the remote computer may be connected to the user's computer through any kind of network, including a Local Area Network (LAN) or a Wide Area Network (WAN), or may be connected to an external computer (e.g., through the Internet using an Internet service provider).

The flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the blocks may occur out of the order noted in the figures. For example, two consecutive blocks may in fact be executed substantially in parallel, and they may sometimes be executed in the reverse order, depending on the functionality involved. Each block of the block diagrams and/or flowchart illustrations, and combinations of blocks in the block diagrams and/or flowchart illustrations, can be implemented by special purpose hardware-based systems which carry out the specified functions or acts, or combinations of special purpose hardware and computer instructions.

The elements described in connection with the embodiments disclosed herein may be implemented in software or hardware. The name of an element does not in any way constitute a limitation on the element itself.

The functions described herein above may be performed, at least in part, by one or more hardware logic components. For example, without limitation, exemplary types of hardware logic components that may be used include: Field Programmable Gate Arrays (FPGA), Specific Integrated Circuits (ASIC), Specific Standard Products (ASSP), System on a Chip (SOC), Complex Programmable Logic Devices (CPLD), etc.

According to the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination as above. More specific examples of a machine-readable storage medium may include one or more wire-based electrical connections, a portable computer diskette, a hard disk, a Random Access Memory (RAM), a Read-only Memory (ROM), an Erasable Programmable Read-only Memory (EPROM or Flash Memory), an optical fiber, a Compact Disc Read-only Memory (CD-ROM), an optical storage device, a magnetic storage device, or any suitable combination as above.

According to some embodiments of the target tracking method, the determining state information about the selected target according to the single-target tracked result and the multiple-target tracked result includes:
  determining position information about the selected target according to the single-target tracked result;
  determining position information about multiple targets according to the multiple-target tracked result;
  determining that the selected target is in an obstructed state if the similarity between the position information about at least one target in the position information about the multiple targets and the position information about the selected target is greater than or equal to a similarity threshold value;
  determining that the selected target is in an unobstructed state if the similarity between the position information about the multiple targets and the position information about the selected target is less than the similarity threshold value.

According to some embodiments of the target tracking method, the determining state information about the selected target according to the single-target tracked result and the multiple-target tracked result includes:
  acquiring a confidence of the single-target tracked result;
  determining that the selected target is in a lost state if the confidence of the single-target tracked result is less than a confidence threshold value; and
  determining that the selected target is in a lost state if the confidence of the single-target tracked result is greater than or equal to the confidence threshold, and a target is not queried in the multiple-target tracked result according to the position information about the selected target.

According to some embodiments of the target tracking method, the multiple-target tracked result includes: multiple-target position information, multiple-target category information and multiple-target identity information.

According to some embodiments of the target tracking method, the tracking the selected target according to the state information about the selected target and the multiple-target tracked result includes:
  acquiring an intersect over union of the single-target tracked result and the multiple-target tracked result and the category information about the selected target if the selected target is in an unobstructed state;
  determining a target set with intersect over union with the selected target in the multiple-target according to the intersect over union of the single-target tracked result and the multiple-target tracked result; and
  tracking targets in the set of targets that are the same as the category information of the selected target.

According to some embodiments of the target tracking method, the tracking the selected target according to the state information about the selected target and the multiple-target tracked result includes:
  acquiring an intersect over union of the single-target tracked result and the multiple-target tracked result and the category information about the selected target if the selected target is in an obstructed state;
  determining a target set with intersect over union with the selected target in the multiple-target according to the intersect over union of the single-target tracked result and the multiple-target tracked result; and
  tracking a target in the target set that is the same as both category information and identity information about the selected target.

According to some embodiments of the target tracking method, the tracking the selected target according to the state information about the selected target and the multiple-target tracked result includes:
  establishing a first set according to the multiple-target tracked result;
  acquiring a target which is different from the identity information about the selected target and has the same category information, and storing same in a second set; and
  determining a selected target from a third set and tracking the selected target if the selected target is in a lost state, wherein the third set is equal to the difference between the first set and the second set.

According to some embodiments of the target tracking method, the target tracking method further includes:
  acquiring the position information from the external device;
  determining the target to which the position information belongs as a selected target if the position information is inside a target; and
  determining a target of the at least two targets having the smallest distance to the position information as a selected target if the position information is inside at least two targets.

According to some embodiments of the target tracking apparatus, the determination module is configured to:
  determine position information about the selected target according to the single-target tracked result; and
  determine position information about multiple targets according to the multiple-target tracked result;
  determine that the selected target is in an obstructed state if the similarity between the position information about at least one target in the position information about the multiple targets and the position information about the selected target is greater than or equal to a similarity threshold value;

determine that the selected target is in an unobstructed state if the similarity between the position information about the multiple targets and the position information about the selected target is less than the similarity threshold value.

According to some embodiments of the target tracking apparatus, the determination module is configured to:

acquire a confidence of the single-target tracked result;

determine that the selected target is in a lost state if the confidence of the single-target tracked result is less than a confidence threshold value; and determine that the selected target is in a lost state if the confidence of the single-target tracked result is greater than or equal to the confidence threshold, and a target is not queried in the multiple-target tracked result according to the position information about the selected target.

According to some embodiments of the target tracking apparatus, the multiple-target tracked result comprises: multiple-target position information, multiple-target category information and multiple-target identity information.

According to some embodiments of the target tracking apparatus, the tracking module is configured to:

acquire an intersect over union of the single-target tracked result and the multiple-target tracked result and the category information about the selected target if the selected target is in an unobstructed state;

determine a target set with intersect over union with the selected target in the multiple-target according to the intersect over union of the single-target tracked result and the multiple-target tracked result; and track a target in the set of targets that is the same as the category information of the selected target.

According to some embodiments of the target tracking apparatus, the tracking module is further configured to:

acquire an intersect over union of the single-target tracked result and the multiple-target tracked result and the category information about the selected target if the selected target is in an obstructed state;

determine a target set with intersect over union with the selected target in the multiple-target according to the intersect over union of the single-target tracked result and the multiple-target tracked result; and track a target in the target set that is the same as both category information and identity information about the selected target.

According to some embodiments of the target tracking apparatus, the tracking module is further configured to:

establish a first set according to the multiple-target tracked result;

acquire a target which is different from the identity information about the selected target and has the same category information, and storing same in a second set; and determine a selected target from a third set and tracking the selected target if the selected target is in a lost state, wherein the third set is equal to the difference between the first set and the second set.

According to some embodiments of the target tracking apparatus, the target tracking apparatus further includes:

a position information acquisition module configured to acquire the position information input from the external device;

a first target determination module configured to determine the target to which the position information belongs as a selected target if the position information is inside a target; and a second target determination module configured to determine a target of the at least two targets having the smallest distance to the position information as a selected target if the position information is inside at least two targets.

The foregoing is only a preferred embodiment of the preferred embodiment of the present disclosure and the technical principles applied thereto. It will be understood by a person skilled in the art that the present disclosure is not limited to the embodiments described herein, and that various obvious changes, rearrangements and substitutions can be made by a person skilled in the art without departing from the scope of the invention. Therefore, while the disclosure has been described in considerable detail with reference to the above embodiments, it is to be understood that the disclosure is not limited to the above embodiments, but it is intended to cover various other equivalent embodiments without departing from the spirit of the invention, the scope of which is defined by the appended claims.

What is claimed is:

1. A target tracking method, comprising:

acquiring a single-target tracked result for a selected target and multiple-target tracked results for multiple targets, wherein the multiple targets comprise the selected target which is a target determined according to first position information input from an external device;

determining state information about the selected target according to the single-target tracked result and the multiple-target tracked results; and tracking the selected target according to the state information about the selected target, the single-target tracked result and the multiple-target tracked results.

2. The method according to claim 1, wherein the determining state information about the selected target according to the single-target tracked result and the multiple-target tracked result comprises:

determining second position information about the selected target according to the single-target tracked result;

determining third position information about multiple targets according to the multiple-target tracked result;

determining that the selected target is in an obstructed state if the similarity between the third position information about at least one target of the multiple targets and the second position information is greater than or equal to a similarity threshold value; and determining that the selected target is in an unobstructed state if the similarity between the third position information about any of the multiple targets and the second position information about the selected target is less than the similarity threshold value.

3. The method according to claim 1, wherein the determining state information about the selected target according to the single-target tracked result and the multiple-target tracked result comprises:

determining second position information about the selected target according to the single-target tracked result;

acquiring a confidence of the single-target tracked result;

determining that the selected target is in a lost state if the confidence of the single-target tracked result is less than a confidence threshold value; and determining that the selected target is in a lost state if the confidence of the single-target tracked result is greater than or equal to the confidence threshold, and a target is not queried in the multiple-target tracked result according to the second position information about the selected target.

4. The method according to claim 1, wherein the multiple-target tracked result comprises: multiple-target position information, multiple-target category information and multiple-target identity information.

5. The method according to claim 4, wherein the tracking the selected target according to the state information about the selected target, the single-target tracked result and the multiple-target tracked results comprises:
   acquiring intersect over unions of the single-target tracked result and the multiple-target tracked results and single-target category information about the selected target if the selected target is in an unobstructed state;
   determining a target set with intersect over unions with the selected target in the multiple targets according to the intersect over unions of the single-target tracked result and the multiple-target tracked results; and
   tracking targets, the multiple-target category information about which is the same as the single-target category information, in the target set.

6. The method according to claim 4, wherein the tracking the selected target according to the state information about the selected target, the single-target tracked result and the multiple-target tracked results comprises:
   acquiring intersect over unions of the single-target tracked result and the multiple-target tracked results and single-target category information about the selected target if the selected target is in an obstructed state;
   determining a target set with intersect over unions with the selected target in the multiple targets according to the intersect over unions of the single-target tracked result and the multiple-target tracked results; and
   tracking a target, both the multiple-target category information and the multiple-target identity information about which are respectively the same as the single-target category information and single-target identity information about the selected target, in the target set.

7. The method according to claim 4, wherein the tracking the selected target according to the state information about the selected target, the single-target tracked result and the multiple-target tracked results comprises:
   establishing a first set according to the multiple-target tracked results;
   acquiring a target, the multiple-target identity information of which is different from single-target identity information about the selected target and the multiple-target category information of which is the same as single-target category information about the selected target, and storing the acquired target in a second set; and
   determining a updated selected target from a third set and tracking the updated selected target if the selected target is in a lost state, wherein the third set is equal to the difference between the first set and the second set.

8. The method according to claim 1, further comprising:
   acquiring the first position information from the external device;
   determining a target to which the first position information belongs as the selected target if the first position information is inside the target; and
   determining a target of at least two targets having the smallest distance to the first position information as the selected target if the first position information is inside the at least two targets.

9. A target tracking apparatus, comprising:
   one or more processors; and
   a memory configured to store instructions executable by the one or more processors,
   wherein the one or more processors, upon execution of the instructions, are configured to:
   acquire a single-target tracked result for a selected target and multiple-target tracked results for multiple targets, wherein the multiple targets comprise the selected target which is a target determined according to first position information input from an external device;
   determine state information about the selected target according to the single-target tracked result and the multiple-target tracked results; and
   track the selected target according to the state information about the selected target, the single-target tracked result and the multiple-target tracked results.

10. The apparatus according to claim 9, wherein the one or more processors are further configured to:
    determine second position information about the selected target according to the single-target tracked result;
    determine third position information about multiple targets according to the multiple-target tracked result;
    determine that the selected target is in an obstructed state if the similarity between the third position information about at least one target of the multiple targets and the second position information is greater than or equal to a similarity threshold value; and
    determine that the selected target is in an unobstructed state if the similarity between the third position information about any of the multiple targets and the second position information about the selected target is less than the similarity threshold value.

11. The apparatus according to claim 9, wherein the one or more processors are further configured to:
    determine second position information about the selected target according to the single-target tracked result;
    acquire a confidence of the single-target tracked result;
    determine that the selected target is in a lost state if the confidence of the single-target tracked result is less than a confidence threshold value; and
    determine that the selected target is in a lost state if the confidence of the single-target tracked result is greater than or equal to the confidence threshold, and a target is not queried in the multiple-target tracked result according to the second position information about the selected target.

12. The apparatus according to claim 9, wherein the multiple-target tracked result comprises: multiple-target position information, multiple-target category information and multiple-target identity information.

13. The apparatus according to claim 12, wherein the one or more processors are further configured to:
    acquire intersect over unions of the single-target tracked result and the multiple-target tracked results and single-target category information about the selected target if the selected target is in an unobstructed state;
    determine a target set with intersect over unions with the selected target in the multiple targets according to the intersect over unions of the single-target tracked result and the multiple-target tracked results; and track a target, the multiple-target category information about which is the same as the single-target category information, in the target set.

14. The apparatus according to claim 12, wherein the one or more processors are further configured to:
acquire intersect over unions of the single-target tracked result and the multiple-target tracked results and single-target category information about the selected target if the selected target is in an obstructed state;
determine a target set with intersect over unions with the selected target in the multiple targets according to the intersect over unions of the single-target tracked result and the multiple-target tracked results; and
track a target, both the multiple-target category information and the multiple-target identity information about which are respectively the same as the single-target category information and single-target identity information about the selected target, in the target set.

15. The apparatus according to claim 12, wherein the one or more processors are further configured to:
establish a first set according to the multiple-target tracked result;
acquire a target, the multiple-target identity information about which is different from single-target identity information about the selected target and the multiple-target category information about which is the same as single-target category information about the selected target, and storing the acquired target in a second set; and
determine an updated selected target from a third set and tracking the updated selected target if the selected target is in a lost state, wherein the third set is equal to the difference between the first set and the second set.

16. The apparatus according to claim 9, wherein the one or more processors are further configured to:
acquire the first position information input from the external device;
determine a target to which the first position information belongs as the selected target if the first position information is inside the target; and
determine a target of at least two targets having the smallest distance to the first position information as the selected target if the first position information is inside the at least two targets.

17. A computer device, comprising a memory, at least one processor and a plurality of computer program instructions stored on the memory, the computer program instructions being executed by the at least one processor, to cause the at least one processor to perform the following operations:
acquiring a single-target tracked result for a selected target and multiple-target tracked results for multiple targets, wherein the multiple targets comprise the selected target which is a target determined according to first position information input from an external device;
determining state information about the selected target according to the single-target tracked result and the multiple-target tracked results; and
tracking the selected target according to the state information about the selected target, the single-target tracked result and the multiple-target tracked results.

18. The computer device according to claim 17, wherein the operation of determining state information about the selected target according to the single-target tracked result and the multiple-target tracked result comprises:
determining second position information about the selected target according to the single-target tracked result;
determining third position information about multiple targets according to the multiple-target tracked result;
determining that the selected target is in an obstructed state if the similarity between the third position information about at least one target of the multiple targets and the second position information is greater than or equal to a similarity threshold value; and
determining that the selected target is in an unobstructed state if the similarity between the position information about any of the multiple targets and the second position information about the selected target is less than the similarity threshold value.

19. The computer device according to claim 17, wherein the operation of determining state information about the selected target according to the single-target tracked result and the multiple-target tracked result comprises:
determining second position information about the selected target according to the single-target tracked result;
acquiring a confidence of the single-target tracked result;
determining that the selected target is in a lost state if the confidence of the single-target tracked result is less than a confidence threshold value; and
determining that the selected target is in a lost state if the confidence of the single-target tracked result is greater than or equal to the confidence threshold, and a target is not queried in the multiple-target tracked result according to the second position information about the selected target.

20. The computer device according to claim 17, wherein the at least one processor further performs the operations as follows:
acquiring the first position information input from the external device;
determining a target to which the first position information belongs as the selected target if the first position information is inside the target; and
determining a target of at least two targets having the smallest distance to the first position information as the selected target if the first position information is inside the at least two targets.

* * * * *